3,152,259
PROTECTIVE CIRCUIT FOR ELECTRICAL
SYSTEMS ON AUTOMOTIVE VEHICLES
Lawrence J. Heine, Bethlehem, Pa., assignor to Mack Trucks, Inc., Plainfield, N.J., a corporation of New York
Filed Dec. 29, 1960, Ser. No. 79,233
8 Claims. (Cl. 290—50)

This invention relates to improvements in electrical systems for automotive vehicles such as passenger automobiles, trucks, buses and the like, and it relates particularly to an improved protective circuit for preventing damage to the vehicle or its components resulting from short circuits in the electrical system of the vehicle.

Typical automotive electric circuits include an engine-driven D.C. generator or an alternator with rectifiers for charging the storage battery of the vehicle. Usually one terminal of the battery is grounded to the frame or other conductive element of the vehicle while the other terminal is connected to the starting motor circuit and the auxiliary circuits such as the lights, heater fan, turn indicators, cigarette lighter, radio and the like. The auxiliary circuits mentioned above usually are provided with fuses, circuit breakers or the like to protect the components of the circuit or circuits in the event of a short circuit therein.

The battery circuit is designed to carry the high current required by the cranking motor or a starter. To that end, large cables of low resistance connect the battery to the starter, and to ground. These large low resistance cables present a hazard for the reason that when a short circuit develops a very heavy current flows almost invariably causing the cable insulation to burn with resulting damage to or destruction of the vehicle. Due to the high current required for operation of the cranking motor or starter, it is usual to provide a magnetic switch or relay in the battery circuit. The relay is closed in response to operation of a manually or foot-controlled switch in the driver's compartment to connect the battery to the starting motor. The relay cannot be a circuit breaker or overload switch because it must carry the high cranking motor current. It cannot be designed to protect the auxiliary circuits and still pass enough current to energize the cranking motor or starter.

In accordance with the present invention, the new battery circuit includes a normally open magnetic switch in the ground circuit of the battery which closes simultaneously with the starter relay and a circuit breaker or overload switch also in the ground circuit which serves to complete connections between the battery and the auxiliary circuits when the starter relay and the magnetic switch are open, thereby maintaining the auxiliary circuits operative but protecting them if a damaging short-circuit in the starter cable occurs. By providing a circuit breaker or overload switch in the ground connection, the entire circuit is protected, except during cranking which is an inconsequential percentage of the time.

For a better understanding of the present invention, reference may be had to the accompanying drawing in which.

Figure 1:
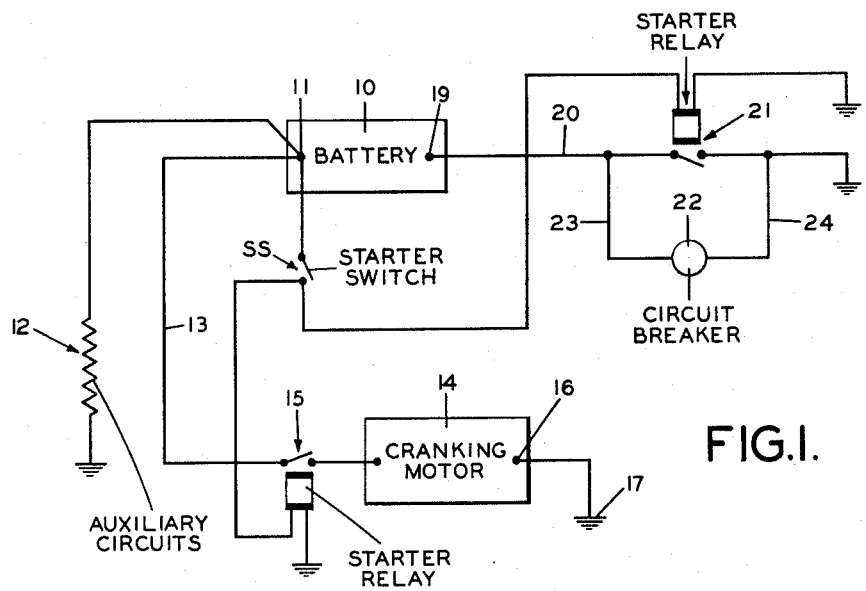
FIGURE 1 is a schematic illustration of a typical electrical circuit for automotive vehicle embodying the claims of the invention.

As illustrated schematically in FIGURE 1, the new electrical circuit includes a battery 10 which is charged by a generator of the D.C. or alternating current type (not shown) driven by the engine of the vehicle. One terminal 11 of the battery is connected to the auxiliary circuits 12 including the light circuit, heater fan, radio, cigarette lighter and the like all of which are illustrated schematically and collectively as a resistance which has one end grounded on the vehicle. Also connected to the battery terminal 11 is a heavy, low-resistance cable 13 for the starter or cranking motor 14. A magnetic switch or relay 15 is interposed in the cable 13 to connect and disconnect the cranking motor 14 and the battery terminal 11.

The opposite terminal 16 of the cranking motor 14 from that connected to the cable 13 is grounded as at 17 on the vehicle frame and thereby connected to the grounded terminal 19 of the battery.

Terminal 19 of the battery is grounded by cable 20 to the vehicle frame.

In accordance with the present invention, a magnetic switch or relay 21 is interposed in the cable 20 between the battery and ground. The switch 21 is similar to the magnetic switch or relay 15 and is closed simultaneously with the relay 15 by means of a starter switch SS operated by the driver. When the starter switch is operated by the driver, both of the normally open magnetic switches or relays 15 and 21 are closed to complete a circuit through the battery 10 and cranking motor 14. When the engine starts, both of the magnetic switches 15 and 21 open.

In order to maintain operative the auxiliary circuits 13, a circuit-breaker 22 is connected in parallel with or across the terminals of the magnetic switch 21 to complete a circuit between the terminal 19 and ground. Circuit-breaker 22 and the conductors 23 and 24 used to bypass the switch 21 may be of suitable electrical design to handle, without difficulty, the current load or drain imposed on the battery by the auxiliary circuits. However, in the event of a short circuit, for example, in the cranking motor cable 13, the circuit breaker 22 will be overloaded by the high current flow and will open, thereby opening all of the circuits to prevent burning of the starter cables or damage to any of the auxiliary circuits or other elements or components of the electrical system of the vehicle. During cranking, the circuit-breaker 22 will not open for the reason that the major part of the current required for operating the cranking motor will flow through the heavy ground cable 20.

The circuit-breaker 22 can be reset manually or, if desired, it may be a delayed action, self-resetting circuit breaker which will close after a short delay but will immediately reopen if the short circuit still exists.

Figure 2:
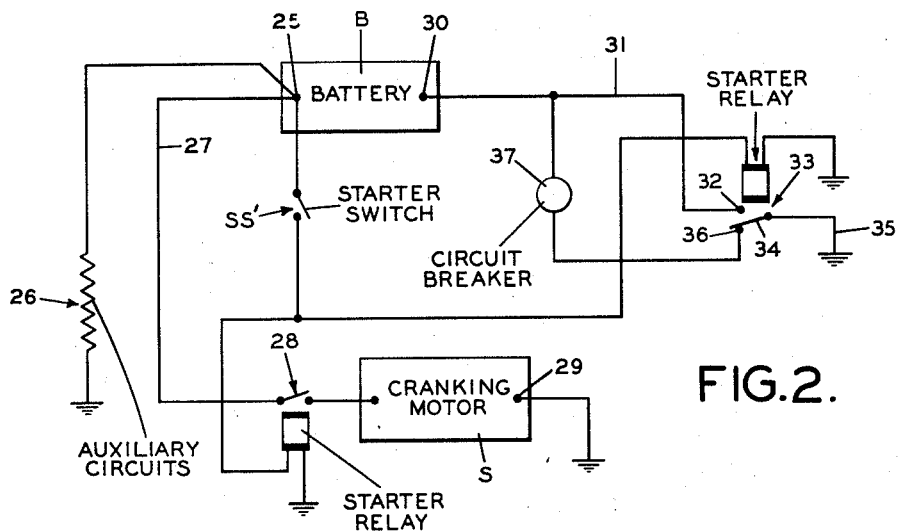
FIGURE 2 is a schematic wiring diagram of a modified type of circuit.

In order to avoid actuation of the circuit breaker during operation of the cranking motor, another arrangement of elements may be provided as disclosed in FIGURE 2. In this circuit, the terminal 25 of the battery B is connected to the auxiliary circuits 26 and through the starter or cranking motor cable 27 and relay 28 to the cranking motor S, the opposite terminal 29 of which is grounded. The battery terminal 30 is connected by means of a heavy cable 31 to one contact 32 of a single pole, double-throw magnetic switch or relay 33. The blade 34 of the switch is connected to ground by a heavy starter cable 35. The switch 33 is so constructed that blade 34 normally does not engage the contact 32 thereby leaving the starter circuit normally open but does engage a second switch contact 36 which is connected through the normally closed circuit breaker 37 and the cable 31 to the terminal 30.

With the new system, when the starter switch SS' is operated by the driver, the relay 28 will close and the relay 33 will be energized to move the switch blade 34 into engagement with the contact 32 thereby bypassing the circuit breaker 37 and connecting the battery terminal 30 to ground to supply the heavy current flow required for operation of the cranking motor or starter S. When the engine is started, the starter switch SS' will be open by the driver to open the relay 28 and allow the blade 34 of the magnetic switch 33 to move into engagement with the contact 36 thereby connecting the circuit breaker 37 in series with the battery terminal 30, closed relay contacts 36 and 34 and ground. If the battery cable 27 becomes grounded or any other short circuit occurs, the circuit breaker 37 will open thereby breaking the connection between the battery B and the ground and preventing damage to the battery, circuits or components thereof.

If desired, the magnetic switch 33 may be provided with a latch which enables the switch blade 34 to be moved to and retained in a position out of engagement with both of the contacts 32 and 36, to prevent starting of the engine or operation of any of the components of the auxiliary circuits. Such a latch is useful when the vehicle is being serviced or undergoing repair. It also provides an effective anti-theft system, particularly if provided with a lock and key.

It will be understood that the protective system disclosed in FIGURE 2 is susceptible to further modification. For example, the switch 33 might be interposed at the junction between the circuit breaker 37 and the battery terminal 30 rather than between the circuit breaker and ground as shown in FIGURE 2. Accordingly, it will be understood that the forms of the invention disclosed herein are illustrative.

I claim:

1. In a vehicle electrical system including a battery having positive and negative terminals, one of which is grounded, a starting motor, a first starter relay including a normally open switch interposed between said motor and the other terminal, and auxiliary circuits connected to said other terminal and to ground, the combination of a battery protective circuit comprising a second starter relay including a normally open switch operable with said first relay switch and interposed between said one battery terminal and ground, said second starter relay switch being closed when said first relay switch is closed to actuate said motor and a normally closed, overload switch interposed between ground and said one battery terminal, said overload switch connecting said terminal to ground at least during the time when the starting motor is not actuated and said overload switch being opened in response to overloads and short circuits to disconnect said one terminal from ground.

2. The electrical system set forth in claim 1 in which said overload switch is connected in parallel with said second relay switch between said one terminal and ground.

3. The electrical system set forth in claim 1 in which said second relay switch is a single pole, double throw switch having one position for connecting said overload switch in a circuit between said one terminal and ground and a second position directly connecting said one terminal to ground and by-passing overload switch during actuation of said starting motor.

4. A protective circuit for vehicle electric systems including a battery having positive and negative terminals, a cranking motor and auxiliary circuits, each having a terminal connected to one of said battery terminals, and another terminal and a first starter relay including a normally open switch interposed between said one battery terminal and said motor for energizing said motor when said starter relay switch is closed and deenergizing said motor when said starter relay switch is open, said protective circuit comprising a connection between the other battery terminal and said other terminals of said motor and said auxiliary circuit, a second starter relay including a normally open switch in said connection operable with first relay switch for completing a circuit through said battery and said motor when said first relay switch is closed, said second relay switch normally being open when said first relay switch is open, and a normally closed overload switch in parallel with said second relay switch in said connection to complete a circuit through said auxiliary circuits and said battery while said starting motor is deenergized, said overload switch being operative under overload conditions to open the circuit through said battery, said motor and said auxiliary circuits.

5. A battery protective circuit for vehicle electrical systems comprising a battery having one terminal connected to a starting motor circuit including a first starter relay including a normally open switch and auxiliary vehicle circuits and another terminal, a circuit including a second starter relay including a normally open switch operable with said first relay switch to connect said another terminal to said starting motor and said auxiliary circuits for energizing them, said second relay switch being closed when said starting motor is energized and open when said motor is deenergized, and a normally closed overload switch connected in parallel with said normally open second relay switch and responsive to an overload condition in said circuits for breaking the connection between said battery and said auxiliary and starting motor circuits.

6. A battery protective circuit for vehicle electrical systems comprising a battery having one terminal connected to a starting motor circuit including a first starter relay including a normally open switch and auxiliary vehicle circuits and another terminal, a circuit including a second relay including a switch having first and second positions and operable with said first relay switch, said second relay switch in said first position connecting said another terminal to said starting motor circuit and said auxiliary circuits to enable them to be energized, and a normally closed overload switch connected between said another terminal and said starting motor circuit and said auxiliary circuits at least while said second relay switch is in its second position.

7. The battery protective circuit set forth in claim 6 in which said overload switch is connected in parallel with said second relay switch between said another terminal and said auxiliary and starting motor circuits.

8. The battery protective circuit set forth in claim 6 in which said second relay switch in its second position connects said overload switch between said another terminal and said auxiliary and starting motor circuits and in said first position interrupts the connection through the overload switch between said another terminal and said auxiliary and starting motor circuits.

References Cited in the file of this patent

UNITED STATES PATENTS

| | | |
|---|---|---|
| 1,060,895 | Eager | May 6, 1913 |
| 2,085,116 | McShane | June 29, 1937 |
| 2,529,195 | Stone | Nov. 7, 1950 |
| 2,581,338 | Roza | Jan. 8, 1952 |
| 2,938,127 | Spinelli et al. | May 24, 1960 |